April 4, 1950      H. J. WICK ET AL      2,502,909
PELLET INJECTOR
Filed March 12, 1947
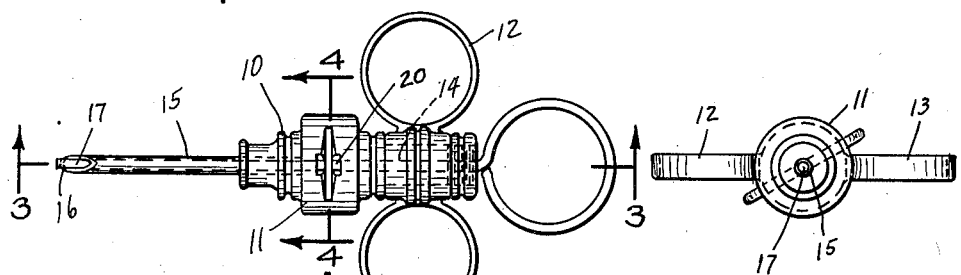
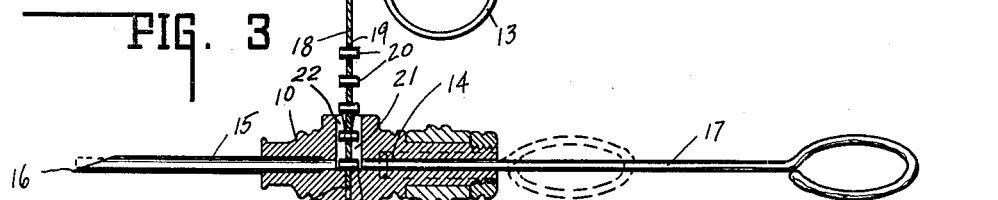
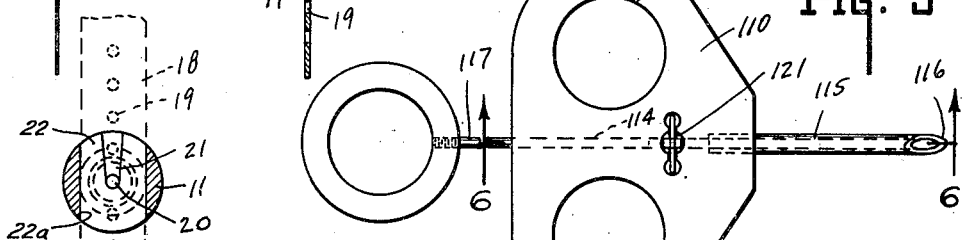
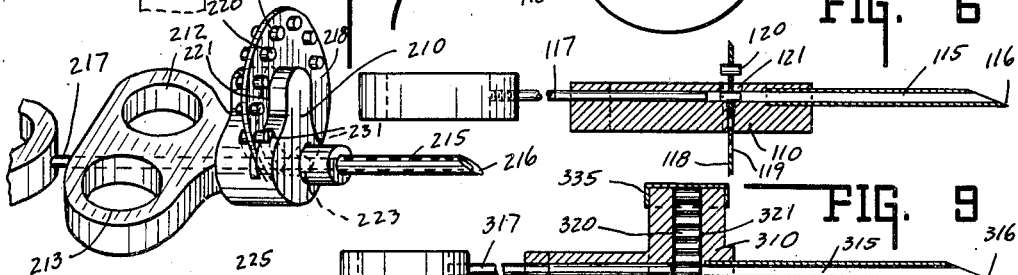
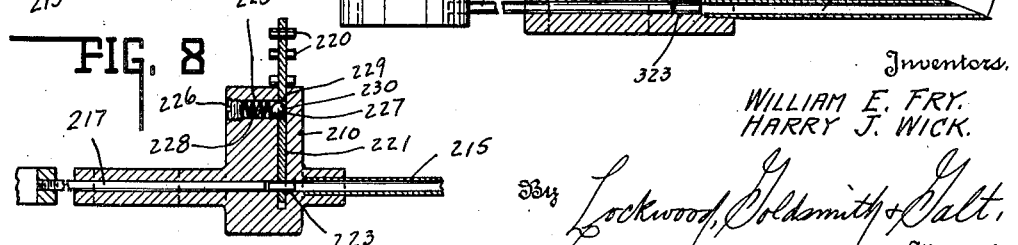
Inventors.
WILLIAM E. FRY.
HARRY J. WICK.
By Lockwood, Goldsmith & Galt,
Attorneys.

Patented Apr. 4, 1950

2,502,909

UNITED STATES PATENT OFFICE 2,502,909

PELLET INJECTOR

Harry J. Wick, Indianapolis, and William E. Fry, Cumberland, Ind., assignors of one-third to Edward D. Campbell, Indianapolis, Ind.

Application March 12, 1947, Serial No. 734,248

3 Claims. (Cl. 128—217)

This invention relates to a pellet injector for use particularly in implanting a female hormone composition in pellet form beneath the skin of poultry and fowl to increase the tenderness, flavor, and weight thereof.

It have been known for several years that estrogens, administered either orally or subcutaneously in fowl, have a decided influence upon the fat metabolism thereof. By reason of the original non-availability of inexpensive estrogens, little interest was aroused in the possible practical applications of this knowledge. At the present time, however, such estrogens are available at a relatively inexpensive price. Consequently, it is becoming more apparent that the owner of poultry and fowl can realize greater profit in marketing them by administering such estrogens and thereby increasing their tenderness, flavor, and weight.

Various problems have arisen in connection with the administration of such estrogens. Oral administration, obviously, has certain advantages over subcutaneous implantation in that there is not the same expense and labor involved in pellet preparation and implantation. It has been found, however, that oral administration is decidedly inferior to pellet implantation and that in some instances 140 mg. of the compound per fowl produced less fattening when orally administered than did 8 mg. absorbed from the implanted pellet.

It has also been determined that oral administration is attended by definite disadvantages, in that there is no assurance that the estrogen will not be voided from the fowl prior to its absorption within the circulatory system. Furthermore, there is always the danger that a portion of the estrogen will still be present in the body of the fowl at the time it is marketed, thereby contaminating it and rendering it deleterious for food consumption purposes.

On the other hand, it has been learned that subcutaneous implantation in pellet form has definite advantages. In the first place, the pellet may be implanted in the neck of the fowl near its head. Deleterious effects resulting from the fact that a residue of the pellet may still exist at the time of marketing, can be avoided by a removal of the neck and head of the fowl.

Furthermore, the element of failure is reduced if not entirely eliminated by such administration, since the pellet cannot be removed or voided from the body of the fowl as frequently occurs in oral administrations.

Again, it has been found that pellet implantation has the advantage of a prolonged caponizing effect, resulting from a gradual absorption of the pellet, thereby enabling the owner of fowl to determine at what time, prior to marketing, he should start the caponizing process.

Finally, it has been learned that subcutaneous implantation is decidedly more effective in bringing about the caponizing results, and requires the use of a much smaller quantity of the estrogen, as pointed out above. This fact results in a smaller expense to the owner of the fowl, and in time more than offsets the initial cost of the pellet injector and the pellets.

It is the chief object of this invention to provide a pellet injector which will enable the owner of poultry and fowl to implant estrogens subcutaneously and thereby derive the many advantages which flow from such an administration.

It is a further object of this invention to provide a pellet injector which carries a plurality of pellets and thereby makes it unnecessary to reload it prior to each implantation.

The full nature of the invention will be understood from the accompanying drawings and the following description and claims:

Fig. 1 is a top plan view of the invention.

Fig. 2 is a front end elevation view thereof.

Fig. 3 is a vertical sectional view thereof taken on line 3—3 of Fig. 1 in the direction of the arrows.

Fig. 4 is a transverse sectional view taken on line 4—4 of Fig. 1 in the direction of the arrows.

Fig. 5 is a top plan view of a modified form of the invention.

Fig. 6 is a vertical sectional view thereof taken on line 6—6 of Fig. 5 in the direction of the arrows.

Fig. 7 is a perspective view of a rotating magazine type modification of the invention.

Fig. 8 is a vertical sectional view thereof.

Fig. 9 is a vertical sectional view of still another modification of the invention.

In the drawings, 10 indicates the injector device generally, and 11 is the body portion thereof to which is secured the finger grip means 12 and 13. Extending longitudinally within the body portion 11 is a bore 14 which is connected to and in alignment with the elongated guide 15, the free end of which has a sharpened termination 16 for penetration of the body tissue of poultry and fowl.

Slidably mounted within the body portion 11 and the elongated guide 15 is a finger reciprocable feeding plunger 17.

In order to supply pellets to the elongated guide 15 there is provided a magazine belt 18 which has a plurality of spaced apertures 19 therein. The pellets 20 are placed transversely within said apertures and are carried thereby in spaced relation. (See Fig. 3).

The body portion has formed therethrough at substantially right angles to the axis of the longitudinally disposed bore, and communicating therewith, a magazine belt receiving chamber 21. This chamber has a width and depth which conforms substantially to that of the belt although it is slightly wider and deeper in order to permit the belt to be slidingly received therein. From its point of communication with the bore, the upper portion of the chamber is centrally enlarged at 22 to provide a guideway for the pellets carried by the belt. Since the lower portion 22ª of the chamber from its point of communication with the bore corresponds in dimensions to those of the belt only, and will not accommodate the pellets carried thereby, it is obvious that the pellets will seat within the bore upon the shoulder 23 formed adjacent either side of the portion 22ª by the walls defining the bore. At such a time the pellet will be in alignment and register with the bore and will be in a position to be projected therethrough by the action of the plunger.

The belt 18 is preferably formed of a material of some weight so that after the removal of each pellet therefrom by the action of the plunger, and after the retraction of the plunger, the belt will automatically be lowered by force of gravity until the next succeeding pellet carried thereby will rest upon the seat or shoulder 23.

When the owner of poultry or fowl is desirous of implanting a pellet in the neck thereof, he places the magazine belt 18 within the chamber 21 after first having retracted the finger reciprocal feeding plunger 17. The belt is lowered within the chamber until the lowermost pellet abuts the stop shoulder 23 at which time, as aforesaid, the pellet is in alignment and registry with the guide 15. At such a time the operator can penetrate the scruff of the neck, for example, of a chicken, with the sharpened termination 16 of the guide and by moving the plunger forwardly can feed the pellet therethrough and implant it in the neck of the chicken. The plunger can then be retracted a distance sufficient to permit the magazine belt 18 to be lowered until another pellet is in alignment with the guide at which time the feeding operation can be repeated.

At Fig. 5 there is shown a modification of this invention which is in fact the desired type, it being preferably fabricated of transparent plastic. It will be observed that the body portion 110 is considerably larger than the body portion 10 of Fig. 1, it having been found that it thereby becomes easier to grip or grasp. The other features, however, remain the same.

At Fig. 7, these is shown a further modification of the invention, it being characterized by a magazine 218 of the rotating barrel type which contains an annular series of selectively spaced apertures 219 coaxial with the pivotal aperture 229. These apertures are formed to receive and accommodate therein the pellets 220. At 221 is shown the magazine chamber formed within the body portion 210 to accommodate and permit the rotation therein of the rotating magazine 218. Formed in the upper portion of said body portion 210 and transversely thereof is a bore 225, one end of which is closed by set screw 226. Positioned within said bore is a small steel ball bearing 227 or the like. Interposed between said set screw 226 and said ball bearing 227 is a light spring 228 which normally constrains said ball bearing into engagement with the adjacent end wall 230 of the body portion 210.

When the operator desires to use said modified injector, he places the pellets 220 within the apertures 219 and then inserts the rotating magazine 218 within the chamber 221. In doing so, the ball bearing 227 is forced rearwardly against the compression of the light spring 228. However, once the magazine 218 is properly centered within the chamber as a result of the alignment and registry of the pivotal aperture 229 with the ball bearing 227, the latter will be forced forwardly by the compression of the spring into locking engagement therewith. The magazine 218 may then be rotated, the pellets being caused thereby to pass successively and through the intermittently accommodating groove 231 formed in the lower portion of the body 210 and into alignment and registry with the elongated guide 215 at which position each pellet is successively stopped by the shoulder 223. The operator may then move the plunger 217 forwardly and thereby feed the pellet through the guide and implant it beneath the skin of the fowl.

At Fig. 9 there is shown a still further modification of the invention. This modification embodies a chamber 321, formed centrally within the body portion 310, and having a breadth corresponding generally to the diameter of the pellets 320 but of necessity somewhat greater, in order to receive and accommodate them. Closing the upper portion of said chamber is a removable friction cap 335. When the operator desires to use this modified injector, he removes the cap 335, and fills the chamber 321 with the pellets 320, they being superposed one upon the other. The lowermost pellet will be seated by force of gravity upon the shoulder 323 and is then in alignment and registry with the elongated guide 315. At such a time the operator may move the plunger 317 forwardly and thereby feed the pellet through the guide and implant it under the skin of the fowl. When the plunger is retracted, another pellet will automatically become seated upon the shoulder 323 ready for implantation.

While the invention has been illustrated and described in great detail in the drawings and foregoing description, the same is to be considered as illustrative and not restrictive in character.

The invention claimed is:

1. In a pellet injector for use in implanting a female hormone pellet beneath the skin of poultry and fowl, the combination of a reciprocable feeding plunger, a body portion including an elongated tubular guide having a sharpened termination for fowl penetration purposes, in which guide the plunger is slidably mounted, a magazine member having spaced apertures adapted to removably support the pellets, said body portion having a chamber formed therethrough substantially at right angles to the axis of said guide and communicating therewith, said chamber including an upper portion having dimensions sufficient to accommodate and slidingly receive said magazine member and the pellets carried thereby, and a lower portion having dimensions sufficient to accommodate and slidingly receive said magazine member alone whereby said pellets are successively positioned within said guide for feeding purposes when the plunger is sufficiently retracted.

2. In a pellet injector for use in implanting a female hormone pellet beneath the skin of poultry and fowl, the combination of a reciprocable feeding plunger, a body portion including an elongated tubular guide having a sharpened termination for penetration purposes, in which guide the plunger is slidably mounted, a magazine member having spaced apertures adapted to removably support pellets, said body portion having a magazine member receiving chamber formed therethrough substantially at right angles to the axis of said guide and intersecting therewith, said guide thereby dividing said chamber into two diametrically opposed radially extending chamber portions, one of said portions being formed to dimensions sufficient to slidingly receive therein said magazine member and the pellets carried thereby, and the other of said portions being formed to dimensions sufficient to slidingly receive therein said magazine member alone, whereby said pellets are successively positioned in alignment with said guide for feeding purposes when the plunger has been sufficiently retracted.

3. In a pellet injector for use in implanting a female hormone pellet beneath the skin of poultry and fowl, the combination of a reciprocable feeding plunger, a body portion including an elongated tubular guide having a sharpened termination for penetration purposes, in which guide the plunger is slidably mounted, a magazine member having vertically spaced apertures adapted to removably support pellets, said body portion having a chamber formed therethrough and communicating with said guide, said chamber having one portion extending radially from said guide through the wall of said body portion and being formed to dimensions sufficient to slidingly receive said magazine member and the pellets carried thereby, and a second chamber portion diametrically opposed to said first chamber portion, extending radially from said guide through the wall of said body portion and having dimensions sufficient to accommodate said magazine member alone whereby a pellet locating shoulder is formed by the walls of said guide adjacent said second chamber portion adapted to have located thereupon a pellet in alignment with said guide for feeding purposes when the plunger is sufficiently retracted.

HARRY J. WICK.
WILLIAM E. FRY.

REFERENCES CITED

The following references are of record in the file of this patent:

UNITED STATES PATENTS

| Number | Name | Date |
| --- | --- | --- |
| 797,183 | Davis | Aug. 15, 1905 |
| 834,261 | Chambers | Oct. 30, 1906 |
| 842,631 | Deperdussin | Jan. 29, 1907 |
| 1,109,072 | Kozmonsky | Sept. 1, 1914 |
| 1,688,332 | Heck, Jr. et al. | Oct. 23, 1928 |